United States Patent
Kim

(10) Patent No.: US 6,735,777 B1
(45) Date of Patent: May 11, 2004

(54) METHOD FOR CONTROLLING PROGRAM GUIDE FOR DISPLAYING BROADCAST PROGRAM TITLE

(75) Inventor: Pil-Tae Kim, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/428,716

(22) Filed: Oct. 28, 1999

(30) Foreign Application Priority Data

Oct. 28, 1998 (KR) .......................................... 98-45344

(51) Int. Cl.⁷ .............................................. H04N 7/173
(52) U.S. Cl. .............................. 725/44; 725/56; 725/29
(58) Field of Search ...................................... 725/39–59

(56) References Cited

U.S. PATENT DOCUMENTS

| | | | |
|---|---|---|---|
| 5,585,838 A | * 12/1996 | Lawler et al. ................. | 725/54 |
| 5,886,690 A | 3/1999 | Pond et al. | |
| 5,892,498 A | 4/1999 | Marshall et al. | |
| 6,094,194 A | * 7/2000 | Jackson ....................... | 345/717 |
| 6,118,492 A | * 9/2000 | Milnes et al. ................ | 348/563 |
| 6,359,661 B1 | * 3/2002 | Nickum ....................... | 348/734 |
| 2003/0079227 A1 | * 4/2003 | Knowles et al. ............. | 725/50 |

FOREIGN PATENT DOCUMENTS

| | | |
|---|---|---|
| JP | HEI9-298697 | 11/1997 |
| JP | HEI10-042207 | 2/1998 |

OTHER PUBLICATIONS

Notice to Submit Response issued by the Korean Industrial Property Office dated Apr. 18, 2001 and its English translation.

* cited by examiner

*Primary Examiner*—Andrew Faile
*Assistant Examiner*—Reuben M. Brown
(74) *Attorney, Agent, or Firm*—Robert E. Bushnell, Esq.

(57) ABSTRACT

A method for controlling a program guide by which a viewer can easily identify the title of a program currently being broadcast among program titles of the respective channels to select the channel on which a desired program is broadcast, is provided. Among the titles of the programs being broadcast on the respective channels by broadcast time, displayed on the screen by receiving the program schedule data transmitted from the respective TV broadcasting stations, only the programs of the respective channels having started before the current time and ending after the current time are highlighted to be displayed on the screen. The titles of the programs currently being broadcast on the respective channels can be easily identified by displaying the same in a different color from the programs of the respective channels broadcast at different time in a TV program guide mode. Therefore, viewers can easily select and watch a desired program among a plurality of programs currently being broadcast.

16 Claims, 2 Drawing Sheets

METHOD FOR CONTROLLING PROGRAM GUIDE FOR DISPLAYING BROADCAST PROGRAM TITLE

CLAIM OF PRIORITY

This application makes reference to, incorporates the same herein, and claims all benefits accruing under 35 U.S.C §119 from an application Entitled Method For Controlling Program Guide For Displaying Broadcast Program Title earlier filed in the Korean Industrial Property Office on Oct. 28, 1998, and there duly assigned Serial No. 98-45344 by that Office.

BACKGROUND OF THE INVENTION

1. Field of the Invention

The present invention relates to a method for controlling a program guide of television broadcasts, and more particularly, to a program guide method for displaying the title of a TV program currently being broadcast on a TV screen.

2. Description of the Related Art

In order to identify the programs to be broadcast on the respective TV channels and the broadcast time thereof, conventionally, viewers had to refer to a program guide occasionally broadcast on the corresponding channel or a printed television programming guide. However, when a printed television program guide or a broadcast program guide is not available, the viewer does not know the broadcast time of a desired program.

To address the shortcoming, in recent years, there has been a technique of inserting schedule data of programs of the respective channels into TV signals transmitted from broadcast stations. Meanwhile, the TV signals are received on the receiving side, and then the program schedule data is displayed on a television screen, so that the viewer is informed of the scheduled programs broadcast on the respective channels. Examples of displayed program guides are found in U.S. Pat. No. 5,886,690 to Russel L. Pond entitled Program Schedule User Interface and U.S. Pat. No. 5,892,498 to Connie T. Marshall et al. entitled Interactive Scroll Program Guide.

However, since the list of program titles is displayed by channel and broadcast time by simply displaying the schedule data on the screen, the viewer must check the broadcast time of each program in order to identify a program currently being broadcast on the respective channels.

SUMMARY OF THE INVENTION

The present invention provides a method for controlling a program guide by which a viewer can easily identify the title of a program currently being broadcast among program titles of the respective channels to select the channel on which a desired program is broadcast.

Accordingly, to achieve the above objective, there is provided a method for controlling a program guide for displaying TV programs being broadcast currently on the respective channels on a TV screen by receiving program schedule data transmitted from the respective TV broadcasting stations, the method including selecting a program guide mode and displaying the titles of programs being broadcast on the respective channels on the screen, checking whether there is a program having started before the current time among the programs of the respective channels, selecting a program ending after the current time among the programs having started before the current time, and displaying the title of the program selected in the selecting step on the screen in a discernible manner.

Also, in the displaying step, the title of the program currently being broadcast is highlighted.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings, wherein.

DESCRIPTION OF THE PREFERRED EMBODIMENT

Figure 1:
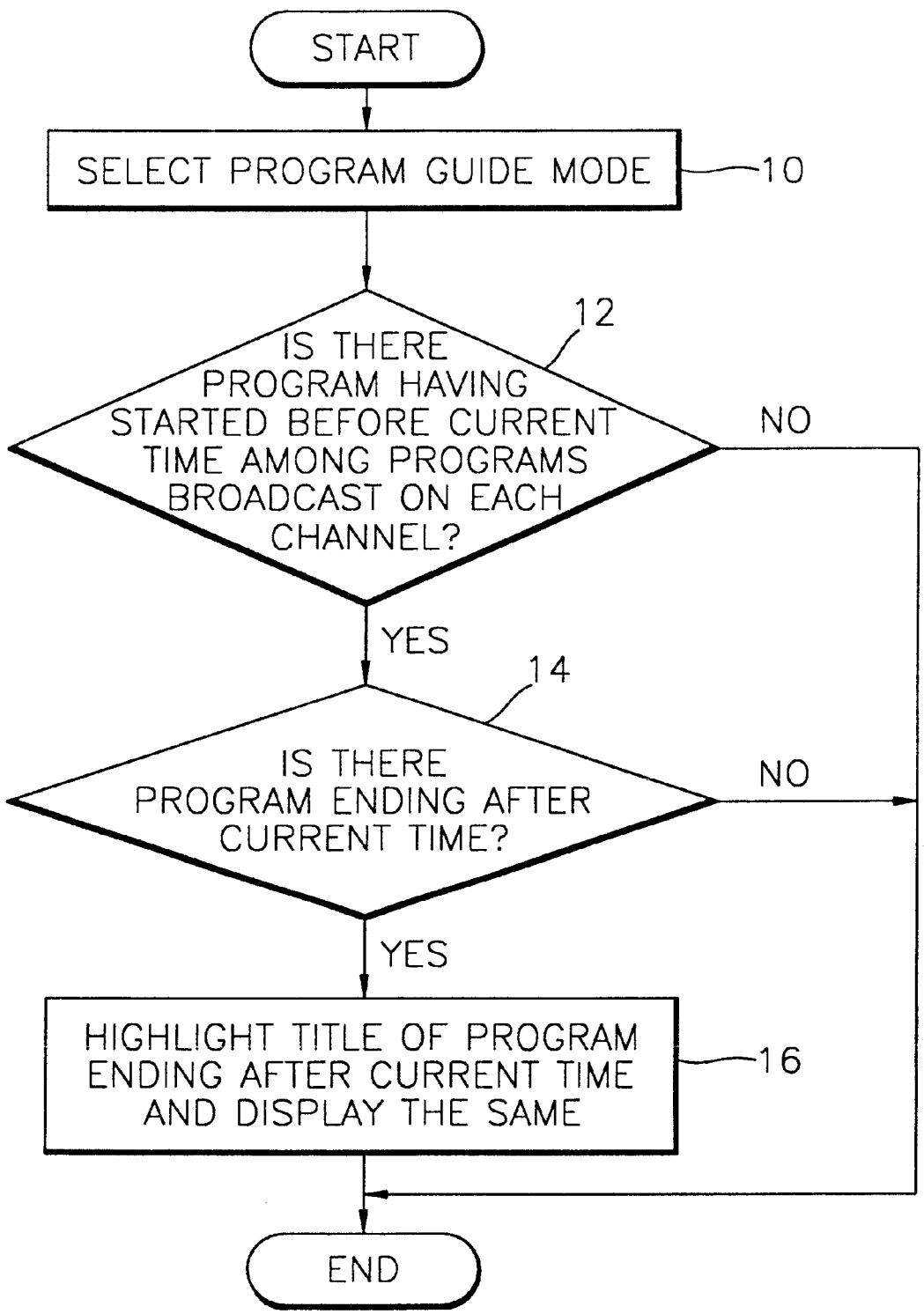
FIG. 1 is a flowchart illustration of the operation of the TV program guide controlling method of the present invention.
Figure 2:
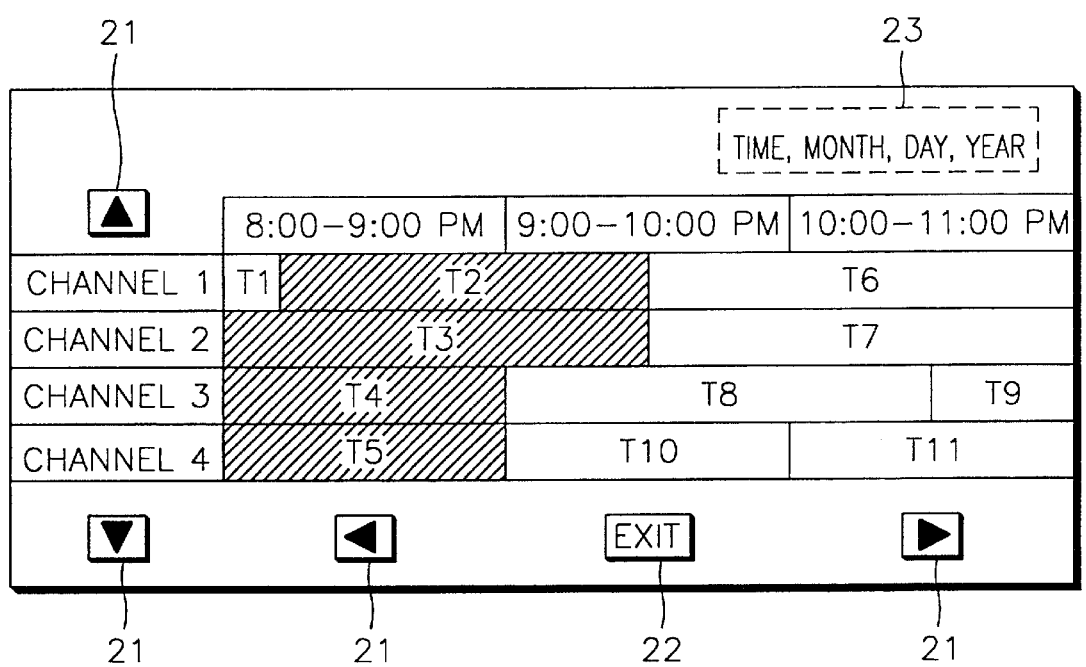
FIG. 2 is an illustration of an example of a TV screen implemented by the method shown in FIG. 1.

Referring to FIGS. 1 and 2, a program guide mode for displaying titles of programs for channel and broadcast time is selected by using a remote controller or an input key to display schedule data transmitted from the respective channels on a screen (step 10). Then, it is checked whether there is a program having started before the current time among the programs of the respective channels (step 12). If yes, it is checked whether there is a program ending after the current time among the programs having started before the current time (step 14). In steps 12 and 14, if there is no corresponding program, the routine ends. In step 14, if there is a program ending after the current time among the programs having started before the current time, the title of the corresponding program is highlighted. In other words, in the case when the current time is 8:25 p.m., then, as shown in FIG. 2, the program titles T2 through T5 currently being broadcast in the respective channels are displayed in a different color from the programs other than the programs currently being broadcast. Thus, a viewer can easily identify the program currently being broadcast. Also, the channel of the corresponding program title can be selected by selecting the corresponding program title and then pressing an ENTER key on the remote controller, for example. In FIG. 2, reference numeral 23 represents current time, month, day and year, reference numeral 21 represents navigation buttons for scrolling titles by channel and broadcast time, and reference numeral 22 represents an EXIT key for terminating the program guide mode. The ATSC (Advance Television Technology Society Committee) has adopted a program and system information protocol (PSIP) for a program guide of digital television broadcasts, and program schedule data (titles of programs for TV channels and broadcast time, etc.) included in bitstreams are broadcast from respective TV broadcast stations according to the PSIP. Users can control navigation buttons 21 by using an eye-pointer on the remote controller to select and highlight one program title among programs currently being broadcast. Then if the enter key on the remote controller is pressed, the channel is changed to the channel corresponding to the selected program title.

According to the present invention, the titles of the programs currently being broadcast on the respective channels can be easily identified by displaying the same in a different color from the programs of the respective channels broadcast at different time in a TV program guide mode. Therefore, viewers can easily select and watch a desired program among a plurality of programs currently being broadcast.

What is claimed is:

1. A method for controlling a program guide for displaying schedule information pertaining to television programs currently being broadcast, television programs to be broadcast at a later time and each available channel on a television screen by receiving program schedule data transmitted from the respective television broadcasting stations, comprising:

selecting a program guide mode and displaying titles of programs scheduled for broadcast, each respective channel and a broadcast time corresponding to each program, on the television screen;

checking whether there are any programs having started before a current time among the programs of the respective channels;

ending said program guide mode when no programs have been found to have started before the current time;

determining whether any of the programs found in the checking step will end after the current time; and displaying the titles of the programs detected in said determining step on the television screen in a discernible manner different from the titles of the other programs.

2. The program guide controlling method according to claim 1, wherein said step of displaying the titles of the programs in a discernible manner comprises highlighting said titles.

3. The program guide controlling method according to claim 1, wherein said step of displaying the titles of the programs in a discernible manner comprises displaying said titles in a color different from the titles of the other programs.

4. The program guide controlling method according to claim 1, further comprising a step of ending said program guide mode when it is determined that no programs found in the checking step will end after the current time.

5. A method for controlling a program guide for displaying schedule information pertaining to television programs currently being broadcast, television programs to be broadcast at a later time and each available channel on a television screen by receiving program schedule data transmitted from the respective television broadcasting stations, comprising:

selecting a program guide mode and displaying titles of programs scheduled for broadcast, each respective channel and a broadcast time corresponding to each program, on the television screen;

checking whether there are any programs having started before a current time among the programs of the respective channels;

determining whether any of the programs found in the checking step will end after the current time;

ending said program guide mode when it is determined that no programs found in the checking step will end after the current time; and displaying the titles of the programs detected in said determining step on the television screen in a discernible manner different from the titles of the other programs.

6. The program guide controlling method according to claim 5, wherein said step of displaying the titles of the programs in a discernible manner comprises highlighting said titles.

7. The program guide controlling method according to claim 5, wherein said step of displaying the titles of the programs in a discernible manner comprises displaying said titles in a color different from the titles of the other programs.

8. The program guide controlling method according to claim 5, further comprising a step of ending said program guide mode when no programs have been found to have started before the current time.

9. A method for controlling a program guide for displaying on a television screen schedule information pertaining to television programs being broadcast within a predetermined time period of a current time by receiving program schedule data transmitted from the respective television broadcasting stations, comprising:

selecting a program guide mode and displaying program titles for each program being broadcast within said predetermined time period according to each programs respective channel and broadcast time;

determining whether any of said programs have started before said current time;

ending said program guide mode when it is determined that no programs have started before the current time;

checking whether the programs found in the determining step will end after said current time; and displaying the titles of the programs that will end after said current time on the television screen in a discernible manner different from the titles of the other programs.

10. The program guide controlling method according to claim 9, further comprising a step of ending said program guide mode when it is determined that none of the programs determined to have started before the current time will end after the current time.

11. The program guide controlling method according to claim 9, wherein said step of displaying the titles of the programs in a discernible manner comprises highlighting said titles.

12. The program guide controlling method according to claim 9, wherein said step of displaying the titles of the programs in a discernible manner comprises displaying said titles in a color different from the titles of the other programs.

13. A method for controlling a program guide for displaying on a television screen schedule information pertaining to television programs being broadcast within a predetermined time period of a current time by receiving program schedule data transmitted from the respective television broadcasting stations, comprising:

selecting a program guide mode and displaying program titles for each program being broadcast within said predetermined time period according to each programs respective channel and broadcast time;

determining whether any of said programs have started before said current time;

checking whether the programs found in the determining step will end after said current time;

ending said program guide mode when it is determined that none of the programs determined to have started before the current time will end after the current time; and displaying the titles of the programs that will end after said current time on the television screen in a discernible manner different from the titles of the other programs.

14. The program guide controlling method according to claim 13, wherein said step of displaying the titles of the programs in a discernible manner comprises highlighting said titles.

15. The program guide controlling method according to claim 13, wherein said step of displaying the titles of the programs in a discernible manner comprises displaying said titles in a color different from the titles of the other programs.

16. The program guide controlling method according to claim 13, further comprising a step of ending said program guide mode when it is determined that no programs have started before the current time.

* * * * *